Nov. 23, 1937.   R. LAPSLEY   2,100,191
HYDRAULIC DRIVE
Filed Aug. 2, 1934   3 Sheets-Sheet 2

Inventor:
Robert Lapsley
By: Brown, Jackson, Boettcher & Dienner
Attys.

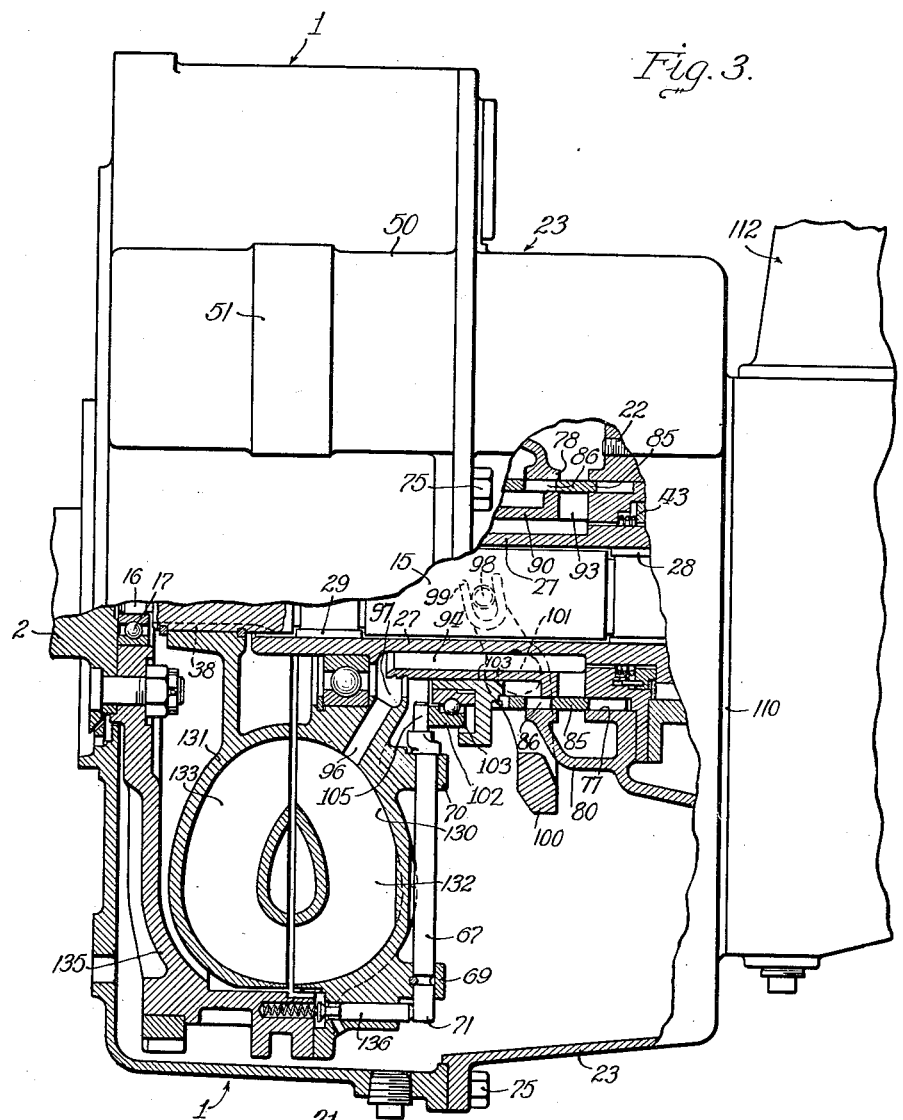

Patented Nov. 23, 1937

2,100,191

UNITED STATES PATENT OFFICE 2,100,191

HYDRAULIC DRIVE

Robert Lapsley, Berrien Springs, Mich., assignor to Clark Equipment Company, Buchanan, Mich., a corporation of Michigan Application August 2, 1934, Serial No. 738,091

16 Claims. (Cl. 60—54)

The present invention relates generally to hydraulic driving means, particularly to fluid clutches, torque converters and the like, and has for its principal object the provision of means for emptying the hydraulic device of the contained fluid so as to interrupt the transmission of torque from the driving to the driven parts.

Torque converters, fluid clutches, and the like are usually provided with a vaned impeller or driving member and a vaned rotor or driven member which, together with a confined fluid, usually in the form of a liquid, serve to transmit torque from a driving member connected with any suitable source of power to a driven member at a rate more or less independent of the actual speed of rotation of the latter. In these and similar devices of which I am aware, when the source of power is being started up, there is a considerable drag, due principally to the confined liquid, and in many such devices it is not unusual to employ a separate mechanical clutch to disconnect the fluid device when the source of power is being started, so as to eliminate the frictional drag on the starting apparatus due to the liquid contained in the driving and driven members of the fluid device.

With these factors in mind, another important object of the present invention is the provision of means for emptying the contained liquid so as to eliminate this drag and to also eliminate any need for additional clutches of the mechanical or friction type, since by emptying the hydraulic device, all drag is eliminated and the hydraulic device itself can then be made to serve as a clutch.

Another important object of the present invention is the provision of means serving as a sump to receive the liquid or fluid from the hydraulic device, the sump then serving as means providing for the reestablishment of the drive to the hydraulic device by the mere act of redirecting the fluid back into the hydraulic device.

Still further, another object of the present invention is the provision of means serving to collect liquid from the bottom of the hydraulic device and redirect it into the torque transmitting means, thereby automatically replenishing any liquid which may be lost from the torque transmitting means by leakage or other means. In this case, the torque transmitting parts need not be made absolutely leak tight, and, hence, expensive seals and the like can be eliminated, according to the principles of the present invention.

A further important object of the present invention is to control the emptying of the hydraulic device and the redirection of liquid into the hydraulic device by one and the same means. Specifically, it is the object of the present invention to provide control means, similar to the ordinary clutch pedal on an automobile, for temporarily interrupting the flow of liquid from the sump to the interior of the hydraulic device at the same time that the valves of the latter are opened to permit emptying the liquid therefrom in order to interrupt the transmission of torque.

A further object of the present invention is the provision of means providing for the emptying of the hydraulic device, whereby the latter may be used as a clutch, particularly in connection with an associated selective sliding gear transmission or the like, whereby gear changing in the transmission is greatly facilitated by temporarily emptying the hydraulic drive device.

These and other objects and advantages of the present invention will be apparent to those skilled in the art after a consideration of the following detailed description of the preferred construction, illustrated in the accompanying drawings.

In the drawings:

Figure 3 is a view similar to Figure 1, illustrating a somewhat different form of fluid torque transmitter and the closed position of the sump valve means;

Figure 5 is a fragmentary section taken through the one-way brake device along the plane of the line 5—5 of Figure 1.

Figure 1:
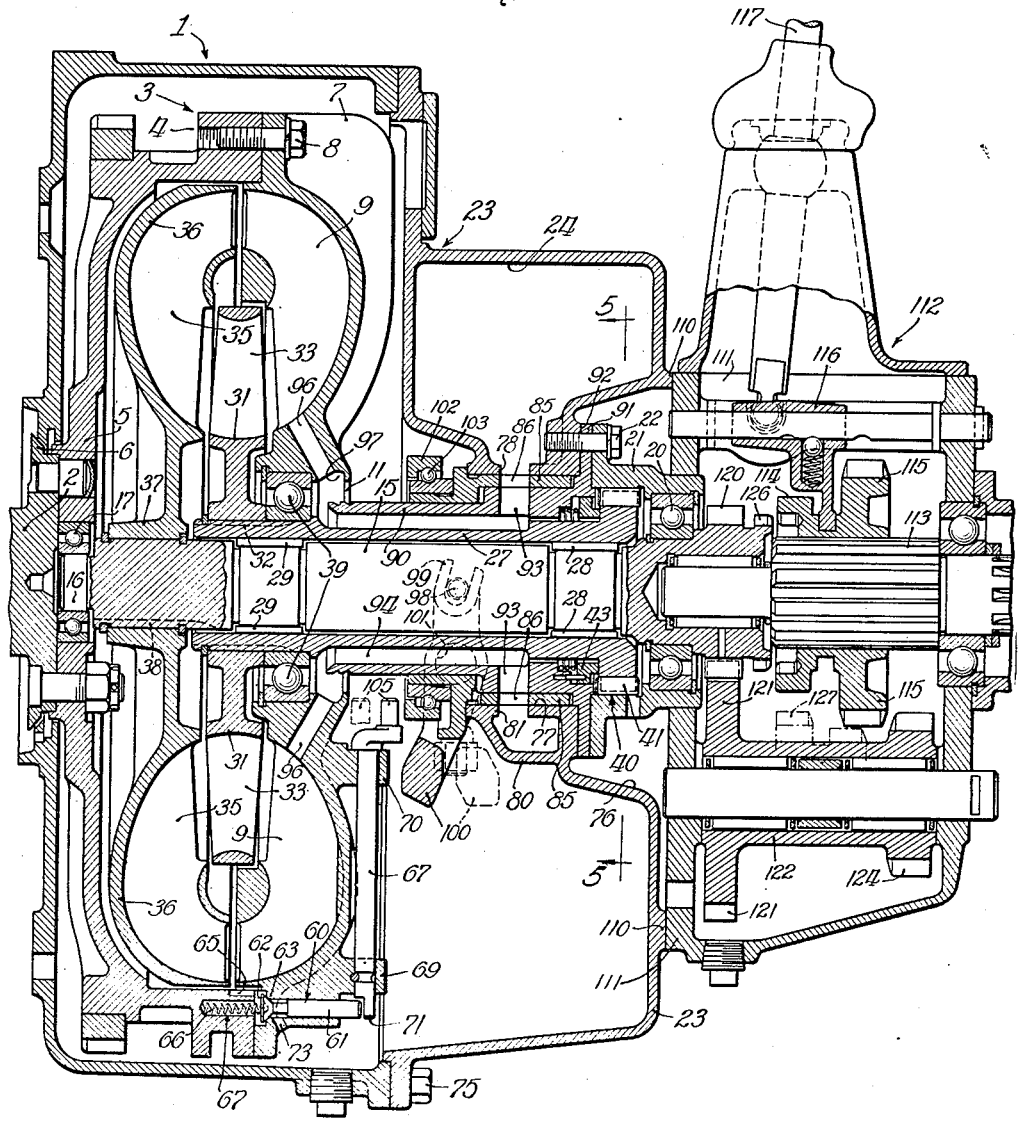
Figure 1 is a vertical longitudinal section taken through a hydraulic drive device constructed according to the principles of the present invention.

Referring now to the drawings, the reference numeral 1 indicates the stationary housing of the device. In the forward wall there is disposed a driving shaft 2 which is connected with or driven by any suitable source of power and which may be in the form of the crank shaft of an internal combustion engine or other suitable prime mover. The housing 1 is a generally cylindrical construction and serves to enclose a hydraulic device in the form of a fluid torque transmitter or converter indicated in its entirety by the reference numeral 3. The torque converter preferably embodies a driving casing 4 having a forward hub portion 5 which is connected directly with a flange 6 formed on the driving shaft 2. The casing 4 carries an impeller section 7, secured thereto by cap screws 8 or the like. The impeller section 7 is provided with a plurality of vanes 9 of conventional construction, and the impeller section 7 is in the form of a continuation of the driving casing 4 and is substantially closed, since the connection between the impeller section 7 and the casing 4 is leak-tight, save for a rear axial opening 11.

Journaled in the housing 1 is a driven shaft section 15 having a reduced end 16 piloted by bearing means 17 in a portion of the rotatable driving casing 4. At its rear end the driven shaft 15 is journaled by bearing means 20 in a rear bearing collar or sleeve 21 which is secured to the rearmost portion of the housing 1 by cap screws 22. The rearmost section of the housing 1 is indicated by the reference numeral 23 and embodies a fluid sump 24 in the upper portion thereof which will be referred to later in detail.

Journaled over the driven shaft 15 is a stator sleeve 27, as by bearing means 28 at the rear end and bearing means 29 at the forward end, and the forward end of the sleeve 27 carries a stator 31 fixed thereto as by a key 32 or the equivalent. The stator includes stator blades 33 disposed between the radially inner portions of the impeller vanes 9 and the vanes 35 of a driven rotor 36 which has a hub portion 37 fixed, as by a key 38, to the forward end of the driven shaft 15 at a point adjacent the forward end of the stator sleeve 27. Bearings 39 are disposed between the impeller 7 and the stator sleeve 27 adjacent the bearings 29 to hold the impeller properly centered with respect to the rotor 36 and the shaft 15. A torque transmitting device of this character is known as a torque converter in that when the driving shaft 2 rotates, the vanes 9 on the impeller section 7 forcibly eject the liquid contained in the driving casing 4 against the radially outer portions of the rotor vanes 35. Thus, the kinetic energy of the liquid, imparted thereto by the driving member 4, is received by the driven member or rotor 36. The vanes 35 are so shaped as to return the fluid toward the radially inner portions of the impeller vanes 9, and the purpose of the stator blades 33 is to redirect the liquid with least loss of flow back into the impeller vanes 9. When the rotor 36 rotates at a speed below that of the driving casing 4, there is a backward reaction of the stator blades 33, but rotation of the stator sleeve 27 in this direction is resisted by virtue of a one-way brake device, indicated in its entirety in Figure 1 by the reference numeral 40. This device, a portion of which is shown in section in Figure 5, may take any known form, as a plurality of clutching rollers 41 or the like, by which relative rotation between the sleeve 27 and the stationary housing 1 in one direction is restrained, but the sleeve 27 may rotate in the other direction relative to the housing. A torque converter of this type is shown and described in detail in my copending application, filed July 12, 1933, Serial No. 680,115, in which certain features of a torque converter of this type are claimed. A spring pressed seal 43 is provided to prevent any loss of liquid from the housing 1 at this point.

Figure 2:
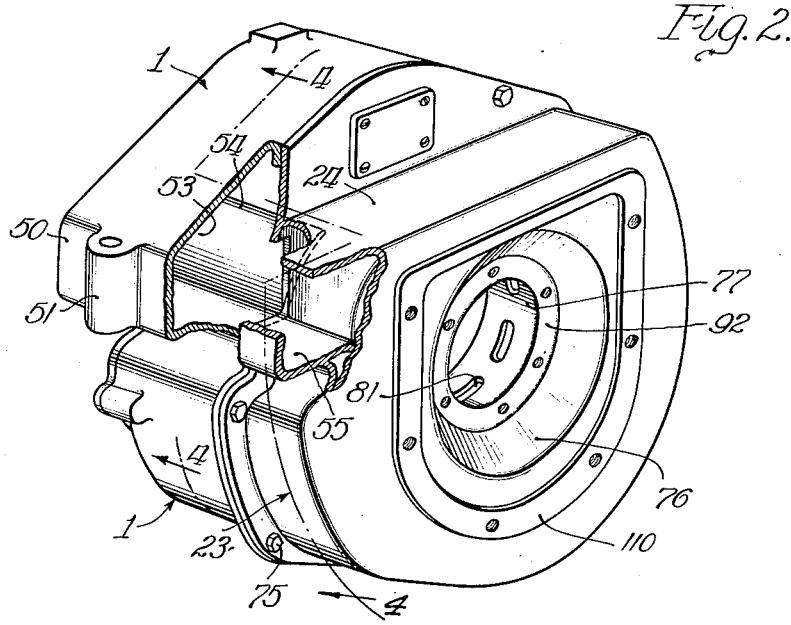
Figure 2 is a view showing the housing with the fluid sump and the means for conducting fluid thereto.
Figure 4:
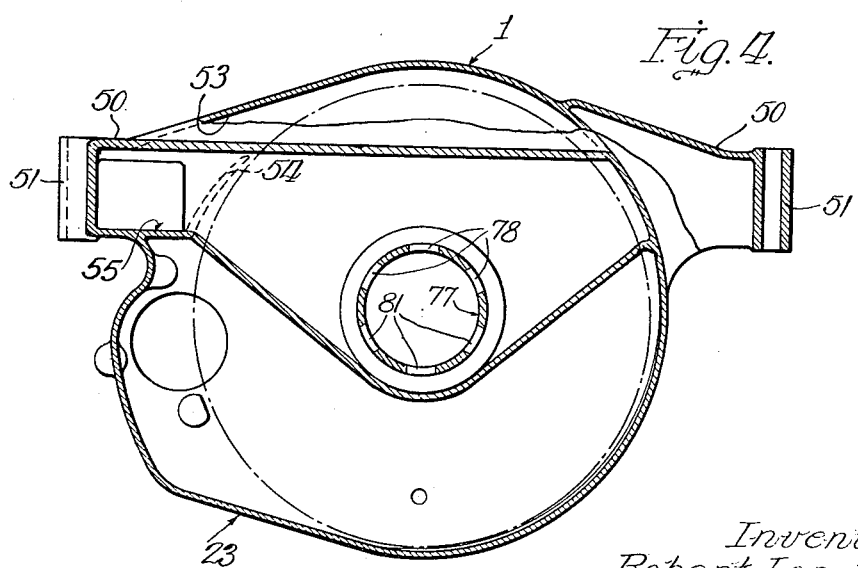
Figure 4 is a transverse section taken through the forward portion of the housing along the line 4—4 of Figure 2.

Laterally extending brackets 50 (Figure 2) are carried by the housing 1, and these brackets carry attaching lugs 51 by which the housing may be mounted in any suitable supporting frame. One of these brackets is made hollow, as indicated in Figure 2 by the reference numeral 53, and the interior chamber formed thereby communicates with the interior of the cylindrical portion of the housing 1 over a curved or inclined separating wall 54 which extends upwardly from the bottom of the hollow bracket section 53 a short distance. This portion of the housing is adapted to catch and retain the fluid thrown upwardly from the bottom of the housing 1 by the rotation of the driving casing 4. The fluid sump 24, which occupies only the upper portion of the section 23 of the housing 1, as described above, is extended laterally, as at 55, so as to receive the fluid thrown upwardly and into the hollow section 53. This section of the housing therefore forms, in effect, trough means along which the fluid is directed toward the sump 24 by virtue of the centrifugal action of the rotating driving casing 4. Thus, should there occur any leakage in the system during the operation thereof, the fluid, usually a liquid, will be thrown upwardly into the trough means 53—54 and directed into the fluid sump 24.

As mentioned above, it is desirable to empty the driving casing 4 of its contained fluid so as to interrupt the transmission of torque from the driving member to the driven member, and according to the principles of the present invention this emptying is accomplished by dumping valves 30 which, when opened, serve to discharge all of the liquid contained in the rotatable driving casing 4 into the bottom of the housing 1 from which the continued rotation of the driving casing then serves to direct the same upwardly and into the trough means 53—54 from which the fluid flows into the sump 24.

The dumping valves are arranged around the periphery of the driving casing 4 and are indicated by the reference numeral 60. Each valve consists of a plunger or stem 61 which extends rearwardly through suitable openings in the impeller section 7, and each valve also includes a conical closure section 62 cooperating with a conical valve seat 63 to which the liquid in the driving casing 4 has access through small bores 65. A spring 66, seated in a bore 67 formed in the forward section of the driving casing 4, serves to yieldingly retain each valve 60 closed at all times. Each of the valves 60 is adapted to be opened by the rotation of a valve rod 67 which is rotatably mounted in a pair of apertured lugs 69 and 70, the radially outer ends of the valve actuating rods 67 being formed as a cam 71 by which, when the valve rod 67 associated with each valve is rotated, that valve is forced open against the tension of the associated spring 66. The liquid in the casing 4 is then discharged through the bore 65, past the valve seat 63 and through a small opening 73 into the radially outer portion of the driving casing 4. The means for operating the several valve rods 67 to open the dumping valves 60 will be referred to later.

The rear section 23 of the housing 1 is preferably formed as a separate casting from the housing proper, the section 23 being secured to the housing proper by means of cap screws 75. The housing section 23 is formed with a rear reentrant portion 76 which terminates in a bore 77 disposed in coaxial relationship with respect to the driving shaft 2 and the driven shaft 15. The sump 24 has a number of radially disposed openings 78 which lead into the bore 77, and the lower portion of the sump is formed with a communicating manifold section 80 from which other radial openings 81 lead into the bore 77. A sleeve valve member 85 is slidably disposed in the bore 77 and is provided with openings 86 which are adapted in one position of the valve member 85 to register with the openings 78 and 81. Disposed within the sleeve valve member 85 is a fixed sleeve 90, one end of which extends into the driving casing 4 through the rear opening 11 in the impeller section 7. The other or rear end of the fixed sleeve 90 has a flange 91 which is clamped by the cap screws 22 between the flange of the bearing sleeve 21 and a flange 92 formed on the rear housing section 23 surrounding the bore 77. The flange 92 is preferably machined to receive the flange 91 in leak-tight relation. Gasket means may be used if desired on either or both sides of the sleeve flange 91. The sleeve 90 is also provided with radial openings 93 which are in alignment with the openings 78 and 81 with which the sump 24 is in communication, and the sleeve 90 is of somewhat larger internal diameter than the external diameter of the stator sleeve 27, so that there is a space 94 between the stator sleeve 27 and the fixed sleeve 90 to provide for the flow of fluid from the sleeve valve openings or ports 86, when they are in communication with the registering openings 78 or 81 and 93 (Figure 1), in between the sleeves 27 and 90 and into the rear opening 11. The section of the impeller 7 adjacent the rear opening 11 is provided with a number of openings or bores 96 arranged as indicated in Figure 1 and communicating with a radially inwardly facing groove 97 so as to lead the fluid entering the driving casing 4 from the forward end of the sleeve 90 into the interior of the driving casing 4.

The sleeve valve member 85 is adapted to be shifted forwardly from its position shown in Figure 1 to the position shown in Figure 3 so as to cut off communication between the sump 24 and the interior of the driving casing 4. For this purpose the sleeve carries a pair of trunnion pins 98 with which the arms 99 of a shift yoke 100 are adapted to cooperate. The shift yoke 100 is pivotally mounted, as at 101, and when it is moved from its full line position to its dotted line position in Figure 1, the sleeve valve 85 is moved to close off the flow of fluid from the sump 24 to the driving casing 4. At the same time that the shift yoke 100 moves the sleeve valve member 85 forwardly, a ring 102 supported on the forward end of the sleeve valve 85 by bearing means 103, engages the crank ends 105 of the several valve actuating rods 67 so that the rods are rocked about their respective supports to open the dumping valves 60 at the same time that the valve means 85, controlling the flow of fluid from the sump 24, is closed.

The operation of the structure so far described is substantially as follows. The torque transmitting fluid usually employed in devices of this sort is oil, and the driving casing 4 is practically oil-tight, as stated above, with the exception that the dumping valves 60 may be opened to empty the driving casing 4. When the driving casing contains the oil in sufficient quantity, the rotation of the impeller section 7 ejects the fluid against the rotor blades 35, driving the rotor and the driven shaft 15, and the blades 33 on the stator 30 reverse the direction of the fluid and return the same into the impeller blades 9 with the minimum amount of loss or fluid flow. Thus, a torque multiplication will be effected between the source of power connected with the driving shaft 2 and the driven shaft 15. This action of the stator 30 in reversing the flow of fluid creates a backward torque tending to rotate the stator 30, but this motion is not permitted because the one-way brake device 40 effectively locks the stator tube 27 against relative rotation in this direction. However, when the speed of the driven member or rotor 36 attains a given rate, the stator 30 will begin to rotate with the rotor, this movement being permitted by the one-way brake device 40, in the manner set forth in my copending application referred to above.

Any leakage which might possibly occur will have no disadvantageous effects on the device because any liquid leaking into the housing 1 will be picked up from the bottom thereof by the rotation of the driving casing 4 and thrown upwardly into the sump compartment 53 from whence the liquid will flow directly into the sump proper 24. The normal running position of the sleeve valve 85 is with the openings 86 in registry with the sump openings, and therefore any liquid which during the operation of the hydraulic device is thrown upwardly into the compartment 53 and the sump 24 will immediately flow through the registering openings and between the sleeves 27 and 90 back into the driving casing 4.

When it is desired to interrupt the transmission of torque from the driving shaft 2 to the driven shaft 15, the shift yoke 100 is actuated to shift the sleeve valve 85 forwardly to cut off the replenishment or flow or liquid from the sump 24 into the driving casing and, at the same time, the actuating ring 102 will engage the crank portions 105 of the several valve actuating rods 67 so as to open the dumping valves 60. Since the driving casing 4 is rotating, when the valves 60 are opened all of the liquid within the casing 4 is emptied out into the housing 1. The continued rotation of the casing 4 delivers all of this liquid up into the compartment or trough means 53—54 from whence it flows into the sump 24. However, the valve 85 is closed by the same movement of the yoke 100 which opened the dumping valves 60, and the torque transmitting liquid remains in the sump 24 as long as the valve 85 is kept closed. Therefore, since there is now no transmitting fluid within the driving casing 4, the transmission of torque from the driving member 4 to the driven rotor 36 is interrupted. The transmission of torque may be restored, however, by opening the valve 85, as by moving the shift yoke 100 back to its full line position, and the movement in this direction will at the same time permit the springs 66 to positively close all of the dumping valves 60. As soon as the valve 85 is opened, the liquid then flows from the sump 24 back into the driving casing 4 and the transmission of torque is therefore resumed.

Heretofore, it has been desirable to utilize sliding gear transmissions of the conventional type in connection with fluid flywheels, fluid clutches, torque converters and the like, in order to secure the advantages of simplicity and efficiency of such transmissions. However, the use of these gear boxes has not been entirely satisfactory, due to the fact that, according to the prior art of which I am aware, the fluid torque transmitting means were so arranged that the torque transmitting fluid was retained at all times, resulting in the condition that starting up with the transmitting fluid contained in the hydraulic device or gear changing while retaining such fluid created such a drag that usually separate clutches had to be provided. Now, according to the principles of the present invention, by providing means for emptying the hydraulic drive device of its contained fluid, no separate clutch means need be provided in order to change gear ratios in the selective sliding gear transmission. This, I consider, is an important feature of the present invention, and to the end of accommodating a sliding gear transmission of conventional construction, the rear portion of the sump section 23 is provided with a flanged part 110 to receive the forward wall of a transmission housing 111. The sliding gear transmission, indicated in its entirety in Figures 1 and 3 by the reference numeral 112, is of conventional construction and preferably employs a splined driven shaft 113 carrying a slidable member comprising a toothed clutch member 114 and a gear 115, as best shown in Figure 1. The slidable member is preferably controlled by a shift fork 116 which, in turn, is controlled by a gear shift lever 117 arranged in the usual manner. In the preferred construction, the rear end of the driven shaft 15 is formed with a driving gear 120 thereon, and this driving gear meshes with a countershaft gear 121. Associated with the countershaft gear 121 is a countershaft 122 of the tubular type and carrying at its rear end a low speed gear 124. The gear 124 is adapted to be engaged by the larger gear 115 on the splined shaft 113 to effect lower speed, and high speed is effected by shifting the toothed member 114 forwardly so that its teeth engage teeth 126 formed on the driven shaft 15 just rearwardly of the driving gear 120. A reversing gear 127 of any conventional form may be provided in the transmission 112.

As mentioned above, by opening the dumping valves 60 and closing the sump valve 85, the transmission of torque by the hydraulic device 3 is interrupted, the device 3 serving then as a clutch, and when the driving casing 4 is emptied of its contained fluid, the gear shift lever 117 may be actuated in the usual manner to select either low or high speed, or reverse, and after the desired speed has been selected, the transmission of torque is resumed by closing the valves 60 and opening the sump valve 85 and filling the driving casing 4.

The hydraulic device 3 described above is of the type known as a torque converter, employing a stator for reversing the direction of the fluid leaving the rotor blades and reentering the impeller blades. As will be apparent, the present invention is not particularly concerned with any particular type of hydraulic drive device, and in Figure 3 I have therefore shown the present invention as embodied in a transmission means having a hydraulic drive device of the fluid clutch type, employing what is termed two-member fluid gear. In such a two-member fluid gear or transmission, there is usually provided an impeller 130 and a runner or rotor 131, these members having blades 132 and 133, respectively, so shaped and angled that the torque transmitting fluid ejected from the impeller blades 132 is received by the rotor or running blades 133, rotating the rotor 131, and the blades 133 serve to return the fluid back into the impeller blades 132. The casing 135 of the impeller 130 is provided with dumping valves 136 which are preferably of the same construction as shown in Figure 1, and they are controlled in the same manner.

The operation of the hydraulic device shown in Figure 3 is substantially the same as the operation of the device shown in Figure 1. That is, by emptying the casing 135 of the contained fluid, the transmission of torque to the gear box 112 is interrupted, providing for the selection of the desired gear ratio, and the transmission of the torque is resumed by closing the dump valves 60 and opening the sump valve 85 and filling the driving casing 135.

As mentioned above, an important feature of the present invention is that change speed transmissions of conventional design may be used, whereby the advantages and the efficiency of the geared reductions can be obtained, together with the additional advantages of fluid transmissions without the disadvantages previously encountered upon attempting to utilize the fluid type of transmission with its attendant fluid drag at idling speeds of the engine and to drag upon starting the same.

While I have shown and described above the preferred construction in which the principles of the present invention have been embodied, it is to be understood that my invention is not to be limited to the specific details shown and described above, but that, in fact, widely different means may be employed in the practice of the broader aspect of my invention.

What I claim, therefore, and desire to secure by Letters Patent is:

1. In a hydraulic drive, a stationary housing, torque transmitting means including a rotatable casing having driving and driven elements therein, a shaft journaled in said housing and carrying said driven elements, a liquid sump carried by said housing spaced axially of said shaft from said torque transmitting means, a stationary sleeve surrounding said shaft and extending from said sump to the interior of said rotatable casing, and valve means disposed between said sump and the interior of said sleeve for controlling the flow of liquid from said sump through said sleeve into said rotatable casing.

2. In a hydraulic drive, a stationary housing, torque transmitting means including a rotatable casing having driving and driven elements therein, a shaft journaled in said housing and carrying said driven elements, a liquid sump carried by said housing spaced axially of said shaft from said torque transmitting means, a sleeve surrounding said shaft and extending from said sump to the interior of said rotatable casing, said sump including a manifold section surrounding said sleeve and the sleeve and manifold section having aligned openings to accommodate the flow of liquid from the sump through the sleeve into the interior of said rotatable casing, and valve means shiftably disposed between said sleeve and the manifold section of said sump and cooperating with said registering openings for controlling the flow of liquid from said sump into said sleeve leading from the sump to the interior of said casing.

3. In a hydraulic drive, a stationary housing, torque transmitting means including a rotatable casing having driving and driven elements therein, a shaft journaled in said housing and carrying said driven elements, a liquid sump carried by said housing spaced axially of said shaft from said torque transmitting means, a stationary sleeve surrounding said shaft and extending from said sump to the interior of said rotatable casing, valve means carried by said rotatable casing and operative to provide for the discharge of liquid therefrom and including operating means extending radially inwardly to a point adjacent said sleeve, means operative by the rotation of said casing for delivering liquid in the bottom of the housing to said sump, valve means controlling the flow of liquid from said sump to the interior of the sleeve leading into the driving casing and extending along said sleeve, and common operating means carried by said sleeve and movable with respect thereto for actuating said two valve means so that when the valve means carried by the casing are opened, the valve means associated with the sump is closed.

4. In a hydraulic drive, a stationary casing, a driving shaft journaled in the forward portion thereof and carrying a substantially liquid-tight casing provided with an opening at its rear portion and a plurality of driving vanes, a driven shaft journaled in said housing and provided with a rotor having vanes disposed adjacent said driving vanes, said casing being adapted to contain a torque transmitting liquid, a liquid sump formed in the rear portion of said housing rearwardly of said driving casing and above the rear opening of the latter, there being an opening in said housing aligned axially with said driving shaft and with the opening in said driving casing, a manifold encircling the opening in said housing and communicating with said sump, a sleeve disposed in the opening in said housing and extending into the driving casing through the opening in the rear thereof, there being radially disposed aligned openings in the rear portion of said sleeve and the radially inner portions of said manifold, a sleeve valve controlling said last named openings and thereby governing the flow of liquid from said sump through said sleeve into said driving casing, means for shifting said sleeve valve, a plurality of dumping valves carried by the peripheral portion of said driving casing, said dumping valves being adapted to be actuated when said sleeve valve is shifted to close said last named openings, and trough means adapted to receive liquid thrown upwardly by said driving casing and adapted to deliver said liquid into said sump.

5. In a hydraulic drive, a stationary housing, a driving shaft journaled in the forward portion thereof and carrying a driving casing having fluid impeller vanes, a driven shaft journaled in said housing and carrying a rotor having driven vanes disposed in cooperative relation with said driving vanes, said driving casing being adapted to contain a torque transmitting fluid therein, a fluid sump carried by said housing and adapted to receive fluid thrown upwardly by the rotation of said driving casing, valve controlled means for conducting fluid from said sump into said driving casing, a plurality of peripherally disposed dumping valves carried by said driving casing and adapted to empty the latter to interrupt the drive from the driving to the driven shaft, a plurality of apertured lugs carried by said driving casing, a plurality of radially disposed valve operating rods carried by said apertured lugs and each having a radially inwardly disposed shoulder abutting against the associated lug to resist radially outwardly directed forces, means connecting each of said rods with the associated dumping valve, and means disposed adjacent the radially inner portions of said rods for controlling the flow of fluid from said sump into said driving casing and cooperating with said valve operating rods to control the operation of said dumping valves.

6. In a hydraulic drive, a stationary housing, a driving shaft journaled therein and carrying a driving casing comprising a generally fluid-tight member having an opening in a central rear portion thereof and provided with driving vanes, a driven shaft journaled in said housing and carrying a rotor having driven vanes mounted for movement closely adjacent the driving vanes carried by said casing, a sleeve mounted on said driven shaft and extending into said driving casing at one end, said end of the sleeve being provided with a stator with blades disposed between said driving and driven vanes, means serving as a one-way brake device fixing the other end of said sleeve to said housing against rotation relative thereto in one direction, a second sleeve encircling said first sleeve and also extending into said driving casing, said second sleeve being carried by the rear portion of said housing, a sump disposed in the upper rear portion of said housing and having a plurality of openings and the second sleeve having a plurality of openings registering with said openings in the sump to provide for the flow of fluid from said sump in between said first and second sleeves to the interior of said driving casing, and means for receiving fluid picked up from the bottom of said housing by said driving casing during the rotation thereof and directing said fluid into said sump.

7. In a hydraulic drive, a stationary housing, a driving shaft journaled therein and carrying a driving casing comprising a generally fluid-tight member having an opening in a central rear portion thereof and provided with driving vanes, a driven shaft journaled in said housing and carrying a rotor having driven vanes mounted for movement closely adjacent the driving vanes carried by said casing, a sleeve mounted on said driven shaft and extending into said driving casing at one end, said end of the sleeve being provided with a stator with blades disposed between said driving and driven vanes, means serving as a one-way brake device fixing the other end of said sleeve to said housing against rotation relative thereto in one direction, bearing means disposed between the end of said sleeve carrying the stator and the driven shaft, other bearing means disposed between said end of said sleeve and the driving casing, a second sleeve also carried by said housing and encircling said first sleeve, said second sleeve also leading into said driving casing but terminating a short distance from said other bearing means, a sump carried by said housing and communicating with the space between said first and second sleeves so as to supply fluid to the interior of said driving casing, and means for receiving fluid picked up from the bottom of said housing by the outer portions of said driving casing during the rotation thereof and delivering the fluid to said sump.

8. A housing for a fluid clutch device including a rotatable casing adapted to contain a fluid, said housing comprising two castings of substantially the same diameter and adapted to be fastened together, one of said castings being adapted to contain said rotatable casing and having an interior chamber disposed in the upper portion thereof substantially in the plane of said rotatable casing and adapted to receive fluid thrown upwardly by the latter, there being registering openings in said castings at one end of said interior chamber, whereby liquid may flow from the latter into the second casting, wall means in the latter dividing the second casting into upper and lower chambers, said upper chamber receiving liquid from said registering openings and forming a sump spaced axially from said interior chamber and adapted to deliver liquid to the interior of said rotatable casing, and said lower chamber communicating with the lower portion of said first casting so as to form a continuation thereof.

9. A housing for a fluid clutch device including a rotatable casing adapted to contain a fluid, said housing comprising a section adapted to contain said rotatable casing, laterally extending brackets carried by said housing adapted to support the same, one of said brackets being hollow and communicating with the interior of said section substantially in the plane of rotation of said rotatable casing, said hollow portion forming a chamber adapted to receive liquid thrown upwardly by said rotatable casing, a second section disposed adjacent said first section and forming a sump adapted to deliver fluid to the interior of said rotatable casing, and trough means for directing fluid laterally from said chamber into said sump, said trough means serving as an extension of the interior of said hollow bracket.

10. In a hydraulic drive, a stationary housing, a driving shaft journaled in the forward portion thereof and carrying a substantially liquid-tight casing provided with an opening at its rear portion and a plurality of driving vanes, a driven shaft journaled in said housing and provided with a rotor having vanes disposed adjacent said driving vanes, said casing being adapted to contain a torque transmitting liquid, a liquid sump formed in the rear portion of said housing rearwardly of said driving casing and above the rear opening of the latter, there being an opening in said housing aligned axially with said driving shaft and with the opening in said driving casing, a manifold encircling the opening in said housing and communicating with said sump, a sleeve disposed in the opening in said housing and extending into the driving casing through the opening in the rear thereof, there being radially disposed aligned openings in the rear portion of said sleeve and the radially inner portions of said manifold, and a sleeve valve controlling said last named openings and thereby governing the flow of liquid from said sump through said sleeve into said driving casing.

11. In a hydraulic drive, a stationary housing having a rear opening, a driving shaft journaled in the forward portion thereof and carrying a substantially liquid-tight casing provided with an opening at its rear portion and a plurality of driving vanes, a driven shaft journaled in said housing and provided with a rotor having vanes disposed adjacent said driving vanes, said casing being adapted to contain a torque transmitting liquid, a liquid sump formed in the rear portion of said housing rearwardly of said driving casing and above the rear opening of the latter, a sleeve disposed in the opening in said housing and extending into the driving casing through the opening in the rear thereof, said sump including a manifold encircling the sleeve, there being aligned openings in the rear portion of said sleeve and said manifold, and a sleeve valve controlling said last-named openings and thereby controlling the flow of liquid from said sump through said sleeve into said driving casing.

12. In a hydraulic drive, a stationary housing, a driving shaft journaled therein and carrying a driving casing comprising a generally fluid-tight member having an opening in a central rear portion thereof and provided with driving vanes, a driven shaft journaled in said housing and carrying a rotor having driven vanes mounted for movement closely adjacent the driving vanes carried by said casing, bearing means disposed between the central rear portion of the driving casing and the driven shaft, there being ducts disposed radially outwardly of said bearing means and leading from said opening into the interior of the driving casing, a sleeve carried by the rear portion of said stationary housing and extending into said opening adjacent said ducts, a sump disposed in the upper rear portion of said housing and having an opening, the sleeve also having an opening adapted to register with said opening in the sump to provide for the flow of fluid from said sump through said sleeve and ducts into the interior of said driving casing, and means for controlling the flow through said registering openings.

13. A hydraulic coupling including a driving and a driven member conjointly defining a fluid operating circuit, said coupling being provided with a discharge port which leads from said operating circuit adjacent the radially outer periphery of said members and which is closed during transmitting operations, and valve means for opening and closing said port and arranged when closed to be held closed by the pressure of fluid in the operating circuit under the action of centrifugal force.

14. In a hydraulic drive, a stationary housing, torque transmitting means including a rotatable casing having driving and driven elements therein, a shaft journaled in said housing and carrying said driven elements, a liquid sump, a sleeve surrounding said shaft and leading into the interior of said rotatable casing, a manifold section surrounding said sleeve, the sleeve and manifold section having aligned openings to accommodate a flow of liquid from the sump through the sleeve into the interior of said rotatable casing, and valve means shiftably disposed between said sleeve and the manifold section of said sump and cooperating with said registering openings for controlling the flow of liquid from said sump into said sleeve leading from the sump to the interior of said casing.

15. In a hydraulic drive, a stationary housing, torque transmitting means including a rotatable casing having driving and driven elements therein, a shaft journaled in said housing and carrying said driven elements, a liquid reservoir, a stationary sleeve surrounding said shaft, means serving as a conduit leading from the reservoir through said stationary sleeve to the interior of said rotatable casing, valve means carried by said rotatable casing and operative to provide for the discharge of liquid therefrom and including operating means extending radially inwardly to a point adjacent said sleeve, valve means controlling the flow of liquid from said reservoir to the interior of the sleeve leading into the driving casing and extending along said sleeve, and common operating means carried by said sleeve and movable with respect thereto for actuating said two valve means so that when the valve means carried by the casing are opened, the valve means associated with the reservoir is closed.

16. In a hydraulic drive, a stationary housing, torque transmitting means including a rotatable casing having driving and driven elements therein, a shaft journaled in said housing and carrying said driven elements, a liquid sump, a sleeve surrounding said shaft and leading into the interior of said rotatable casing, a manifold section surrounding said sleeve, the sleeve and manifold section having aligned openings to accommodate a flow of liquid from the sump through the sleeve into the interior of said rotatable casing, and valve means shiftably disposed between said sleeve and the manifold section of said sump and cooperating with said registering openings for controlling the flow of liquid from said sump into said sleeve leading from the sump to the interior of said casing, dumping valves on said rotatable casing, radially disposed operating means for the dumping valves actuated by the movement of said shiftably disposed valve means, and means for shifting said last named valve means.

ROBERT LAPSLEY.